United States Patent
Herzog et al.

(10) Patent No.: US 10,836,103 B2
(45) Date of Patent: Nov. 17, 2020

(54) APPARATUS FOR CONTROLLING THE EXPOSURE OF A SELECTIVE LASER SINTERING OR LASER MELTING APPARATUS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Markus Lippert, Lichtenfels (DE); Johanna Windfelder, Breitbrunn (DE)

(73) Assignee: Concept Laser GmbH, Lichtenfels (DE)

( * ) Notice: Subject to any disclaimer, the term of this patent is extended or adjusted under 35 U.S.C. 154(b) by 222 days.

(21) Appl. No.: 16/007,813

(22) Filed: Jun. 13, 2018

(65) Prior Publication Data

US 2018/0370128 A1 Dec. 27, 2018

Related U.S. Application Data

(62) Division of application No. 15/526,711, filed as application No. PCT/EP2015/075832 on Nov. 5, 2015, now Pat. No. 10,137,633.

(30) Foreign Application Priority Data

Nov. 12, 2014 (DE) .......................... 10 2014 016 679

(51) Int. Cl.
 *B29C 64/153* (2017.01)
 *B22F 3/105* (2006.01)
 (Continued)

(52) U.S. Cl.
 CPC .......... *B29C 64/153* (2017.08); *B22F 3/1055* (2013.01); *B23K 26/0604* (2013.01);
 (Continued)

(58) Field of Classification Search
 CPC ....... B33Y 50/02; B33Y 30/00; B29C 64/153; B23K 26/0604; B23K 26/342
 See application file for complete search history.

(56) References Cited

U.S. PATENT DOCUMENTS

| 5,574,215 A | * | 11/1996 | Bunger | ................... G01N 7/16 |
| | | | | 73/64.54 |
| 5,615,013 A | * | 3/1997 | Rueb | ...................... G01B 11/00 |
| | | | | 356/394 |

(Continued)

FOREIGN PATENT DOCUMENTS

| CN | 101107882 A | 1/2008 |
| DE | 102012014839 A1 | 1/2014 |

(Continued)

OTHER PUBLICATIONS

Machine translation of Japan Patent document 2009-006,509-A, Dec. 2017.

(Continued)

*Primary Examiner* — Geoffrey S Evans
(74) *Attorney, Agent, or Firm* — Dority & Manning, P.A.

(57) ABSTRACT

A method for controlling the exposure of a selective laser sintering or laser melting apparatus. The method includes providing a selective laser sintering apparatus or laser melting apparatus that uses successive solidification of layers of a powder-type construction material that can be solidified using radiation. The apparatus comprises an irradiation device for irradiating layers of the construction material that has a plurality of scanners that can separately be actuated, simultaneously irradiating the construction material, the separate detection of irradiation times of each scanner and/or the irradiation areas detected by each scanner, and storing the detected irradiation times and/or irradiation areas; comparing the irradiation times and/or irradiation areas of the scanners with each other; re-determining the surface sec- (Continued)

tions of a powder layer to be irradiated by each scanner so the irradiation times for each scanner are approximated to each other and/or the irradiation areas of each scanner are aligned.

18 Claims, 2 Drawing Sheets

(51) Int. Cl.

| | | |
|---|---|---|
| *B33Y 50/02* | (2015.01) | |
| *B33Y 10/00* | (2015.01) | |
| *B33Y 30/00* | (2015.01) | |
| *B29C 64/277* | (2017.01) | |
| *B29C 64/393* | (2017.01) | |
| *B23K 26/06* | (2014.01) | |
| *G02B 26/10* | (2006.01) | |
| *H01S 3/101* | (2006.01) | |
| *H01S 3/102* | (2006.01) | |

(52) U.S. Cl.
CPC .......... *B29C 64/277* (2017.08); *B29C 64/393* (2017.08); *B33Y 10/00* (2014.12); *B33Y 30/00* (2014.12); *B33Y 50/02* (2014.12); *G02B 26/10* (2013.01); *H01S 3/101* (2013.01); *H01S 3/102* (2013.01); *B22F 2003/1056* (2013.01); *B22F 2003/1057* (2013.01); *Y02P 10/25* (2015.11)

(56) References Cited

U.S. PATENT DOCUMENTS

| | | | |
|---|---|---|---|
| 2003/0052105 A1 | 3/2003 | Nagano et al. | |
| 2007/0175875 A1* | 8/2007 | Uckelmann | ........ A61C 13/0013 219/121.85 |
| 2007/0284547 A1 | 12/2007 | Sejersen et al. | |
| 2008/0131104 A1 | 6/2008 | Philippi | |
| 2013/0270750 A1 | 10/2013 | Green | |
| 2014/0198365 A1 | 7/2014 | Li et al. | |
| 2014/0263209 A1 | 9/2014 | Burris et al. | |
| 2015/0210013 A1* | 7/2015 | Teulet | ................... B29C 64/135 264/497 |
| 2015/0283612 A1 | 10/2015 | Maeda | |
| 2016/0082668 A1 | 3/2016 | Perret et al. | |
| 2016/0114432 A1 | 4/2016 | Ferrar et al. | |
| 2017/0348905 A1* | 12/2017 | Fey | .......... F24F 11/72 |
| 2018/0257140 A1* | 9/2018 | Pontiller-Schymura | ..................... B29C 64/277 |
| 2018/0370131 A1* | 12/2018 | Ishikawa | ............... B29C 64/165 |
| 2019/0039318 A1* | 2/2019 | Madigan | .............. B23K 26/032 |
| 2019/0047226 A1* | 2/2019 | Ishikawa | ............... B29C 64/209 |

FOREIGN PATENT DOCUMENTS

| | | |
|---|---|---|
| DE | 102012014840 A1 | 1/2014 |
| DE | 102013208651 A1 | 11/2014 |
| DE | 102014005916 A1 | 10/2015 |
| EP | 2186625 A2 | 5/2010 |
| JP | 2000313067 A | 11/2000 |
| JP | 2007536598 A | 12/2007 |
| JP | 2009/006509 A | 1/2009 |
| JP | 2009006509 A | 1/2009 |
| WO | 2005106588 A1 | 11/2005 |
| WO | WO2014/180971 A1 | 11/2014 |
| WO | WO2014/199134 A1 | 12/2014 |

OTHER PUBLICATIONS

Collocott et al, Dictionary of Science and Technology, Revised Edition, Edinburgh, 1974, pp. 200-201.
International Search Report and Written Opinion Corresponding to Application No. PCT/EP2015/075832 dated Feb. 19, 2016.
Chinese Search Report Corresponding to Application No. 2015800613179 dated Aug. 15, 2018.
Machine Translated Japanese Office Action Corresponding to Application No. dated Sep. 27, 2018.
Gebhardt, "Generative Fertigungsanlagen", Generative Fertigungsverfahren Rapid Prototyping-Rapid Tooling-Rapid Manufacturing, Germany, 2007, p. 122.
Grimm, "Selective Laser Sintering, User's Guide Rapid Protyping", United States of American, 2004, pp. 166.
Voltz, "Computerwissen von A bis Z Eine komprimierte Fachbegriffesammlung", Computer-Fachbegriffe Von A Bis Z, Germany, 1987, pp. 154-157.
European Office Action Corresponding to Application No. 18166334 dated Jul 7, 2020.

* cited by examiner

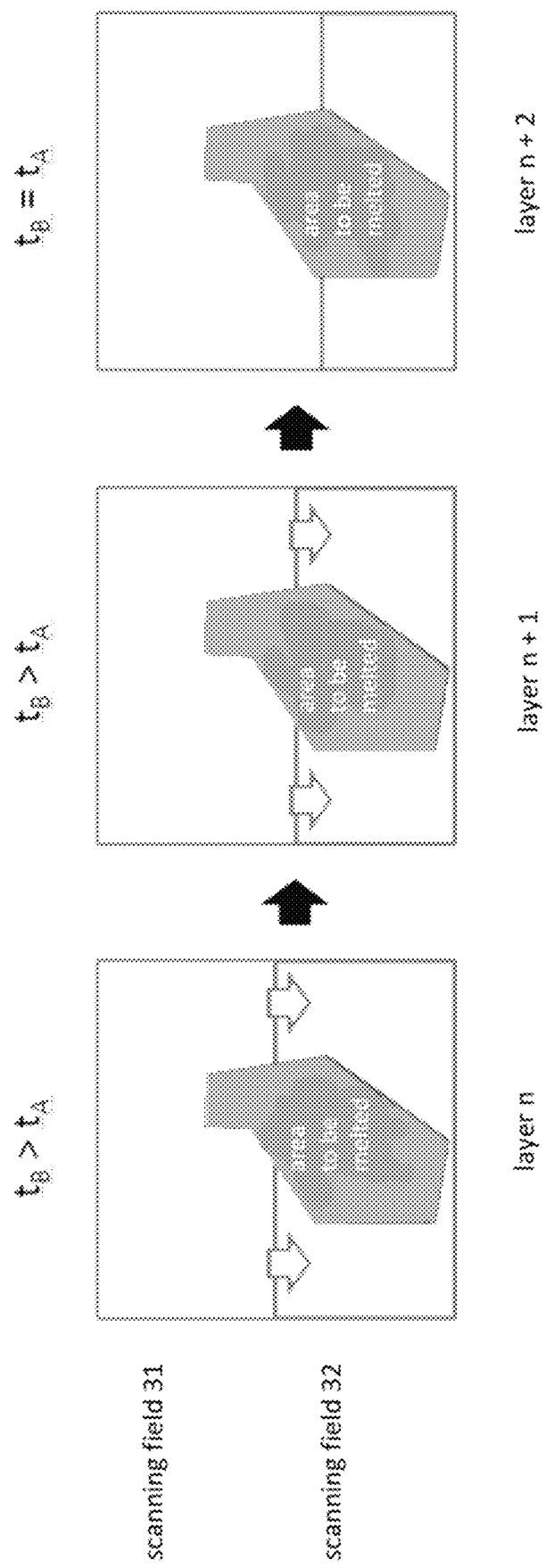

APPARATUS FOR CONTROLLING THE EXPOSURE OF A SELECTIVE LASER SINTERING OR LASER MELTING APPARATUS

This application is a Divisional of U.S. application Ser. No. 15/526,711, filed May 12, 2017, now U.S. Pat. No. 10,137,633, issued Nov. 27, 2018, which was a U.S. 371 National Stage entry of International Application Serial No. PCT/EP2015/075832 filed Nov. 5, 2015, which claims priority to German Application No. 10 2014 016 679.1 filed Nov. 12, 2014. The contents of each of these applications are hereby incorporated herein by reference in their entirety as if set forth verbatim.

The invention relates to an apparatus for performing the method for controlling the exposure of a selective laser sintering or laser melting apparatus for manufacturing three-dimensional objects.

From DE 10 2014 005 916.2 it is known as prior art to use laser sintering or laser melting apparatuses that can be used to manufacture three-dimensional objects by selective irradiation of a construction material, with a plurality of scanners. The scanners are arranged above a construction field and can be either fixedly or movably arranged, i.e. can be moved across the construction field section by section.

In such multi-scanner systems either each portion of a construction field is assigned a separate scanner or the scanners are installed or formed such that they can at least partially expose construction field portions to which another scanner is assigned to support this other scanner in exposing the construction field portion assigned to it, if there the exposure effort in time or area is significantly higher than in the adjacent construction field portion which is to be exposed respectively less.

The present invention is based on the object of providing a method and an apparatus for performing this method, enabling an optimization of the construction process and especially a reduction of the required construction time for an object. This object is solved by the combination of the features of the claims.

In the course of the method according to the invention, the irradiation times of each individual scanner and/or the irradiation areas detected by said individual scanner are at first separately detected and stored in a first step. The detection of the irradiation times can, for example, be determined by a shutter opening signal, said shutter letting radiation energy of a radiation source pass, but other detecting possibilities are also imaginable, e.g. by light sensitive elements or the like, which provide a time signal when activating a scanner that can be electronically stored.

The detection of the irradiation areas can also be performed in different ways, either with photographic technology by detecting an irradiation image in a certain time segment or by use of irradiation times and scanner deflections already determined such that irradiated construction field portions can be determined regarding their irradiated size.

In a second step, the detected and stored irradiation time values and irradiation area values are electronically compared with each other. This can be performed by a comparator that is integrated in an appropriately suited processor or computer.

When the processor/computer determines that the irradiation times or areas deviate from each other, than for the next layer or for a next layer portion a new layout of the surface sections of a powder layer to be irradiated by each individual scanner is determined such that the irradiation times for each individual scanner are possibly approximated to each other and/or the irradiation areas of each individual scanner are aligned with each other in terms of surface area to the largest extend possible.

Said method is performed iteratively, i.e. is repeated again and again, to be able to quickly react accordingly to irradiation geometries changing during the construction process. The subdivision of scanning fields is in each case dynamically adjusted after solidification of one or more layers such that the exposure time for each scanner resulting in each subsequent irradiation course is at least approximately the same. Prior to the construction process, an operator can perform a presetting of the scanning fields for each scanner based on readable control data of the scanners. Of course, it is also possible that an operator quasi-manually intervenes in the iterative approximation of the scanning symbols and quite consciously conducts a displacement of the scanning fields, e.g. for thermal reasons or the like.

It should be suggested that the method according to the invention can also be performed as a "combined method", i.e. that e.g. irradiation times and irradiation areas are measured and e.g. from the irradiation times of a first scanner, the area irradiated by it can be concluded, which is compared with the irradiation areas of a second scanner to achieve the approximation according to the invention.

The border between the scanning fields of two scanners can be a straight line. However, if more than two scanners are used across a construction field, it can be advantageous to also select different courses of the border between the scanning fields.

If the comparison of the irradiation times and/or irradiation areas regarding each scanner results in no displacement of the scanning field borders, then it is very advantageous to have the border between the scanning fields oscillate to avoid striation on the surface.

The control according to the invention adjusts the border between the scanning fields of different scanners in an optimum manner. Though the change of melting area and position is large during an entire construction process, but mostly relatively small from layer to layer, the control is able to bring the construction time closely to the theoretical minimum by small incremental adjustment of the scanning field border throughout the entire construction process.

The invention is explained in more detail by means of advantageous exemplary embodiments in the figures of the drawings.

BRIEF DESCRIPTION OF THE SEVERAL VIEWS OF THE DRAWINGS

FIG. 2 shows three diagrams for scanning field adjustment, wherein in FIG. 2A a (first) layer n, in FIG. 2B another layer n+1 and in FIG. 2C a layer n+2 is shown.

DETAILED DESCRIPTION

Figure 1:
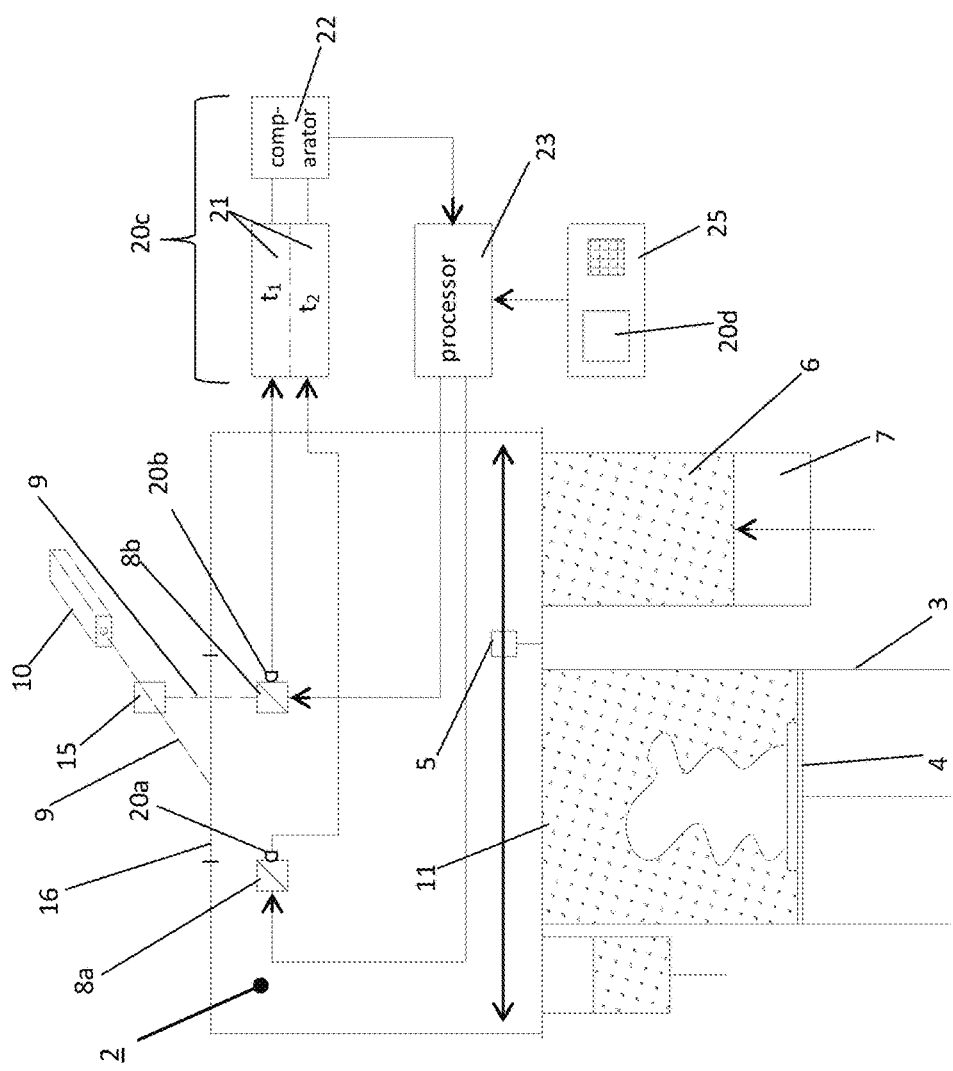
FIG. 1 shows a schematic diagram of the significant components of an apparatus for performing the method.

The apparatus 1 shown in FIG. 1 comprises as significant components a process chamber 2, in which a construction container 3 with a height adjustable construction platform 4 is arranged. Above the construction platform 4 a coating assembly 5 is arranged by which construction material 6 from a metering chamber 7 in the section of the construction container 3 can be applied in the form of thin layers. Above the construction container 3 in the process chamber 2 a plurality of scanners 8a, 8b is arranged by which the radiation 9 of a radiation source 10 can be directed to the construction material layer 11 in the form of a laser in a process-controlled manner to solidify said layer.

The components of the apparatus mentioned are only the components significant to the invention, of course, such a laser sintering or laser melting device comprises a plurality of other components that do not need to be explained in the context of this invention.

The apparatus further has electronic detection units 20a, 20b, 20c, 20d by means of which the irradiation times related to every individual scanner 8 (e.g., 8a, 8b) and/or the irradiation areas detected by a scanner 8 in an irradiation step can separately be detected and stored in an electronic storage 21.

An electronic comparator 22 is connected to the storage 21, by which the stored irradiation time values of the individual scanners 8 can be compared with each other. A processor device 23 is connected with the comparator 22, which in case of deviating irradiation time values of the individual scanners 8 calculates a re-determination of the surface sections to be exposed by each individual scanner 8 such that the irradiation times (or the irradiation areas) of each individual scanner 8 are aligned with each other in terms of surface area to the largest extent possible.

Furthermore, in FIG. 1 an input apparatus 25 having a display 26 is illustrated, by which an operator is able to intervene in the construction process of the laser sintering or laser melting apparatus 1.

It should be briefly noted that the radiation 9 of the radiation source 10 in the illustrated exemplary embodiment is directed via a beam splitter 15 and from there penetrates a window 16 in the upper section of the process chamber 2 to get to the scanners 8a, 8b.

The detection units 20a, 20b, 20c, 20d comprise sensor elements on the scanners or optical switches (shutters) connected upstream said scanners, which detect the irradiation times of the scanners 8 (e.g., 8a, 8b) and store them as irradiation time values T1 and T2 to be compared into storage 21. Said values are compared with each other in the comparator 22 to enable an optimization of the drive of the scanners by the processor.

People skilled in the art know that on the one hand the detection of irradiation times can be replaced or supplemented by a detection of irradiation areas, that the storage and the comparator can be part of an electronic system for operating the apparatus and can be integrated in a computer or a processor.

In FIGS. 2A-2C, it is explained in more detail how the optimization of the scanning fields 31, 32 or the irradiation areas related to the individual scanners 8a, 8b is optimized.

In FIG. 2A, at first a state is shown in which the area of the scanning field 32 to be molten is larger than that of the scanning field 31. For this reason, it is purposeful to shift the border 30 between the scanning field 31 and the scanning field 32 downwards such that in the next layer n+1 according to FIG. 2B an approximation of the scanning fields 31, 32 has already been conducted.

This process is repeated until the scanning fields 31 and 32 are actually the same size, i.e. the irradiation times $t_A$ and $t_b$ are aligned with each other such that both scanners 8a and 8b are at least widely working at the same capacity.

If the comparative measurement of the irradiation times or scanning field sizes results in the border 30 between the scanning fields not needing to be shifted, because the irradiation times are aligned with each other, then an oscillation of the border 30 between the scanning fields 31, 32 is performed to avoid striation in the component.

LIST OF REFERENCE NUMBERS

1 Apparatus
2 Process chamber
3 Construction container
4 Construction platform
5 Coating assembly
6 Construction material
7 Metering chamber
8a Scanner
8b Scanner
9 Radiation
10 Radiation source
11 Construction material layer
15 Beam splitter
20a Detection unit
20b Detection unit
20c Detection unit
20d Detection unit
21 Storage
22 Comparator
23 Processor device
25 Input apparatus
26 Display
30 Border
31 Scanning field
32 Scanning field

The invention claimed is:

1. An apparatus for additively manufacturing three-dimensional objects, the apparatus comprising:
   a first scanner configured to direct radiation to a first region of respective ones of a plurality of sequential layers of construction material to solidify construction material in the first region;
   a second scanner configured to direct radiation to a second region of the respective ones of the plurality of sequential layers of construction material to solidify construction material in the second region; and
   a processor, wherein the processor is configured to allocate irradiation of the respective ones of the plurality of the sequential layers of construction material between the first region and the second region based at least in part on a first irradiation time and/or a second irradiation time such that the first irradiation time and the second irradiation time are at least approximately the same, the first region being assigned the first scanner and the first irradiation time indicative of a time required for the first scanner to irradiate the first region with respect to at least one of the plurality of sequential layers of construction material, and the second region being assigned the second scanner and the second irradiation time indicative of a time required for the second scanner to irradiate the second region with respect to at least one of the plurality of sequential layers of construction material.

2. The apparatus of claim 1, wherein the processor is configured to allocate irradiation of the respective ones of the plurality of sequential layers of construction material between the first region and the second region based at least in part on a first surface area of the first region and/or a second surface area of the second region such that the first surface area and the second surface area are at least approximately the same size.

3. The apparatus of claim 1, wherein the processor is configured to allocate irradiation of one or more subsequent ones of the plurality of sequential layers of construction material between the first region and the second region based at least in part on a first irradiation time and/or a second irradiation time such that the first irradiation time and the second irradiation time are aligned with one another, the first irradiation time indicative of a time required for the first scanner to irradiate the first region with respect to one or more preceding ones of the plurality of sequential layers of construction material, and the second irradiation time indicative of a time required for the second scanner to irradiate the second region with respect to one or more preceding ones of the plurality of sequential layers of construction material.

4. The apparatus of claim 1, comprising:
an electronic detection unit configured to determine the first irradiation time and/or the second irradiation time.

5. The apparatus of claim 4, wherein the electronic detection unit comprises a sensor element or an optical switch.

6. The apparatus of claim 4, comprising:
an electronic comparator configured to compare the first irradiation time with the second irradiation time.

7. The apparatus of claim 4, wherein the processor is configured to re-allocate irradiation of at least one subsequent ones of the plurality of the sequential layers of construction material between the first region and the second region based at least in part on a comparison of the first irradiation time with the second irradiation time.

8. The apparatus of claim 7, wherein the processor is configured to re-allocate irradiation of at least one subsequent ones of the plurality of the sequential layers of construction material between the first region and the second region, such that, for the at least one subsequent ones of the plurality of the sequential layers of construction material, the first irradiation time aligns with the second irradiation time and the first region and the second region have at least approximately the same surface area.

9. The apparatus of claim 1, wherein the first region is located in an upper scanning field and the second region is located in the lower scanning field, and wherein a border delineates the first region from the second region and/or wherein the border delineates the upper scanning field from the lower scanning field.

10. The apparatus of claim 9, wherein the processor is configured to dynamically adjust the border after irradiating respective ones of the plurality of sequential layers of construction material such that the first irradiation time and the second irradiation time are at least approximately the same for respective ones of the plurality of sequential layers of construction material.

11. The apparatus of claim 1, wherein the processor is configured to allocate irradiation of the respective ones of the plurality of sequential layers of construction material between the first region and the second region based at least in part on readable control data from the first scanner and/or the second scanner.

12. The apparatus of claim 11, wherein the processor is configured to allocate irradiation of the respective ones of the plurality of sequential layers of construction material between the first region and the second region at least in part by determining a location for a border that delineates the first region from the second region.

13. The apparatus of claim 12, wherein the processor is configured to allocate irradiation of the respective ones of the plurality of sequential layers of construction material between the first region and the second region such that a first surface area of the first region and a second surface area of the second region are at least approximately the same size.

14. The apparatus of claim 12, wherein the processor is configured to receive an input from an operator, the input from the operator configured to determine the location of the border.

15. The apparatus of claim 11, wherein the processor is configured to adjust the location of the border in incremental steps.

16. The apparatus of claim 15, wherein the border comprises a straight line.

17. The apparatus of claim 15, wherein the processor is configured to oscillate a location of the border corresponding to sequential ones of the plurality of sequential layers of construction material.

18. The apparatus of claim 1, wherein the processor is configured to cause the first scanner and/or the second scanner to perform a pre-exposure.

* * * * *